United States Patent

[11] 3,600,966

| [72] | Inventor | Alan P. Anderson |
| | | Grosse Ile, Mich. |
| [21] | Appl. No. | 17,658 |
| [22] | Filed | Mar. 9, 1970 |
| [45] | Patented | Aug. 24, 1971 |
| [73] | Assignee | Ford Motor Company |
| | | Dearborn, Mich. |

[54] COMPOUND MOTION TRANSMITTING CABLE MECHANISM
4 Claims, 7 Drawing Figs.

[52] U.S. Cl. ................................................. 74/473 SW, 74/484, 74/501 R
[51] Int. Cl. ................................................. G05g 9/00
[50] Field of Search ............................................. 74/501, 473, 473 SW, 475, 476, 477, 484

[56] References Cited
UNITED STATES PATENTS
2,480,083  8/1949  McMillan ................... 74/501 UX
2,503,893  4/1950  Wahlberg .................... 74/473 SW
3,016,758  1/1962  Keller .......................... 74/473
3,472,096  10/1969  Krause ........................ 74/501

*Primary Examiner*—Milton Kaufman
*Attorneys*—John R. Faulkner and Donald J. Harrington ABSTRACT: A motion transmitting cable mechanism adapted to move the shift control levers of a manually operated power transmission mechanism in an automotive vehicle driveline wherein the cable comprises two relatively movable parts, one being operatively received within the other, one part being connected to one shift lever and the other part being connected to the other shift lever, and manually controlled shift linkages operatively connected to the end of each of the cable parts whereby a shift controlling motion pattern for the shift linkages can be transmitted through the cable mechanism to the transmission shift levers to effect transmission ratio changes.

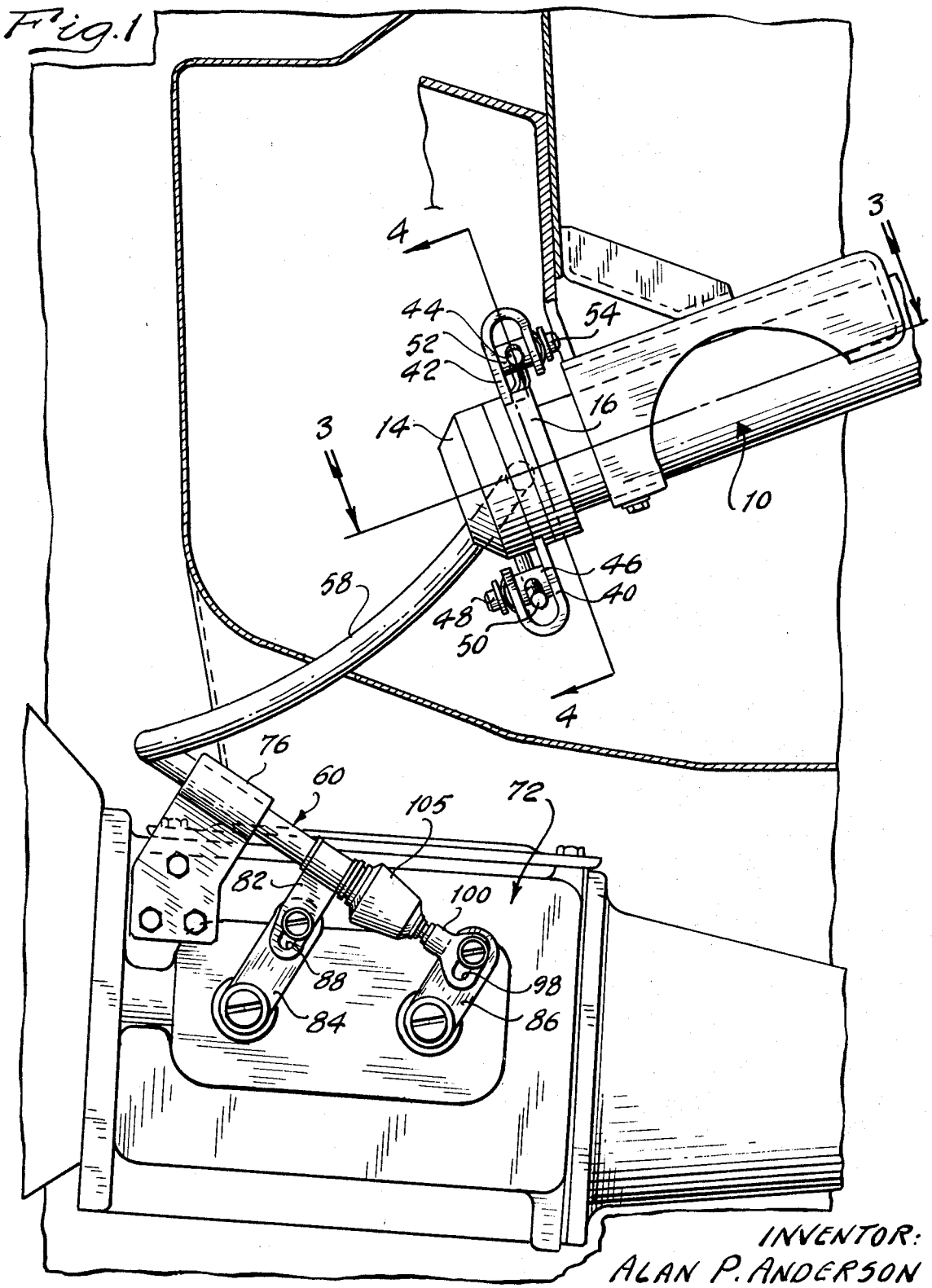

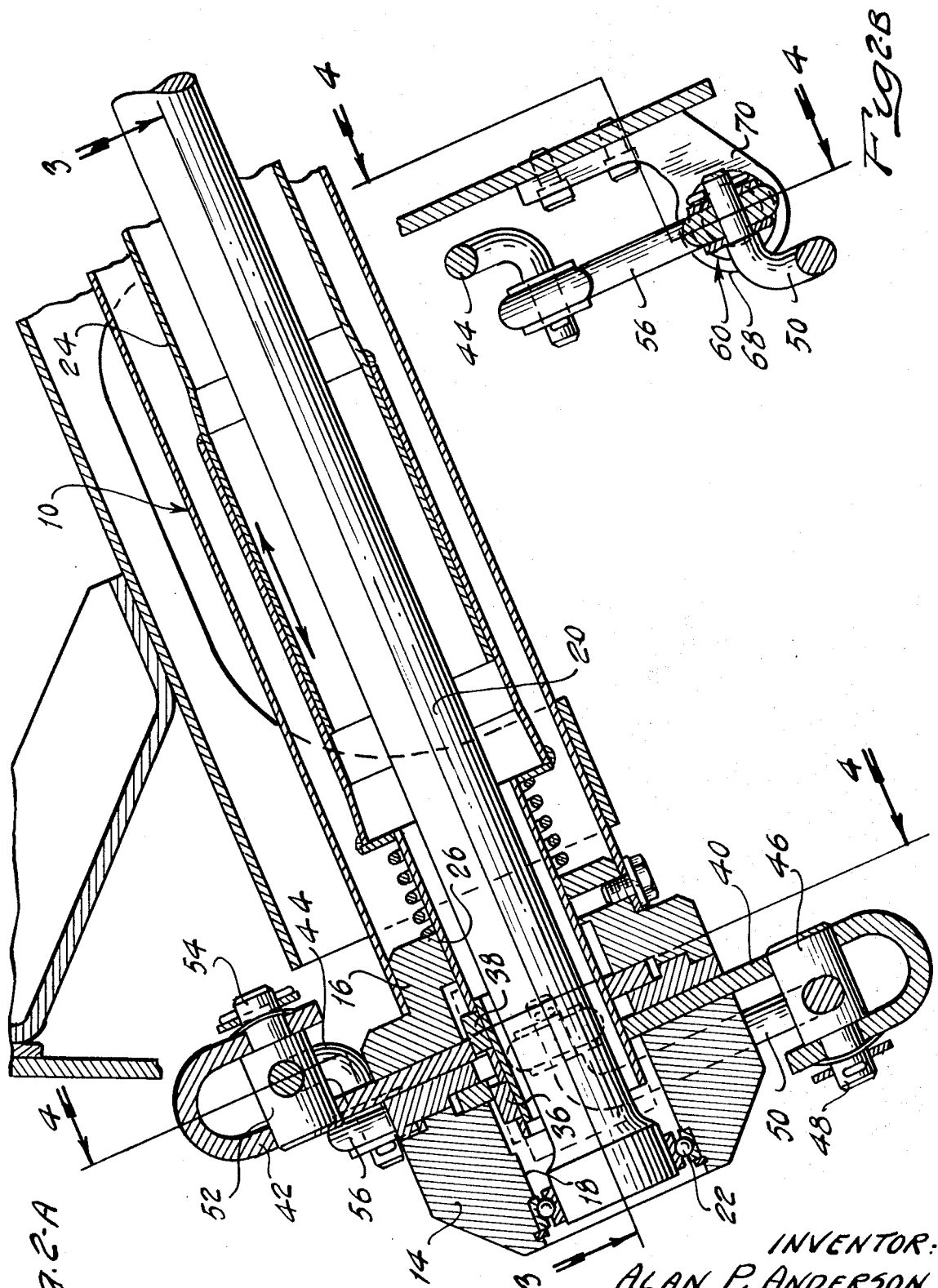

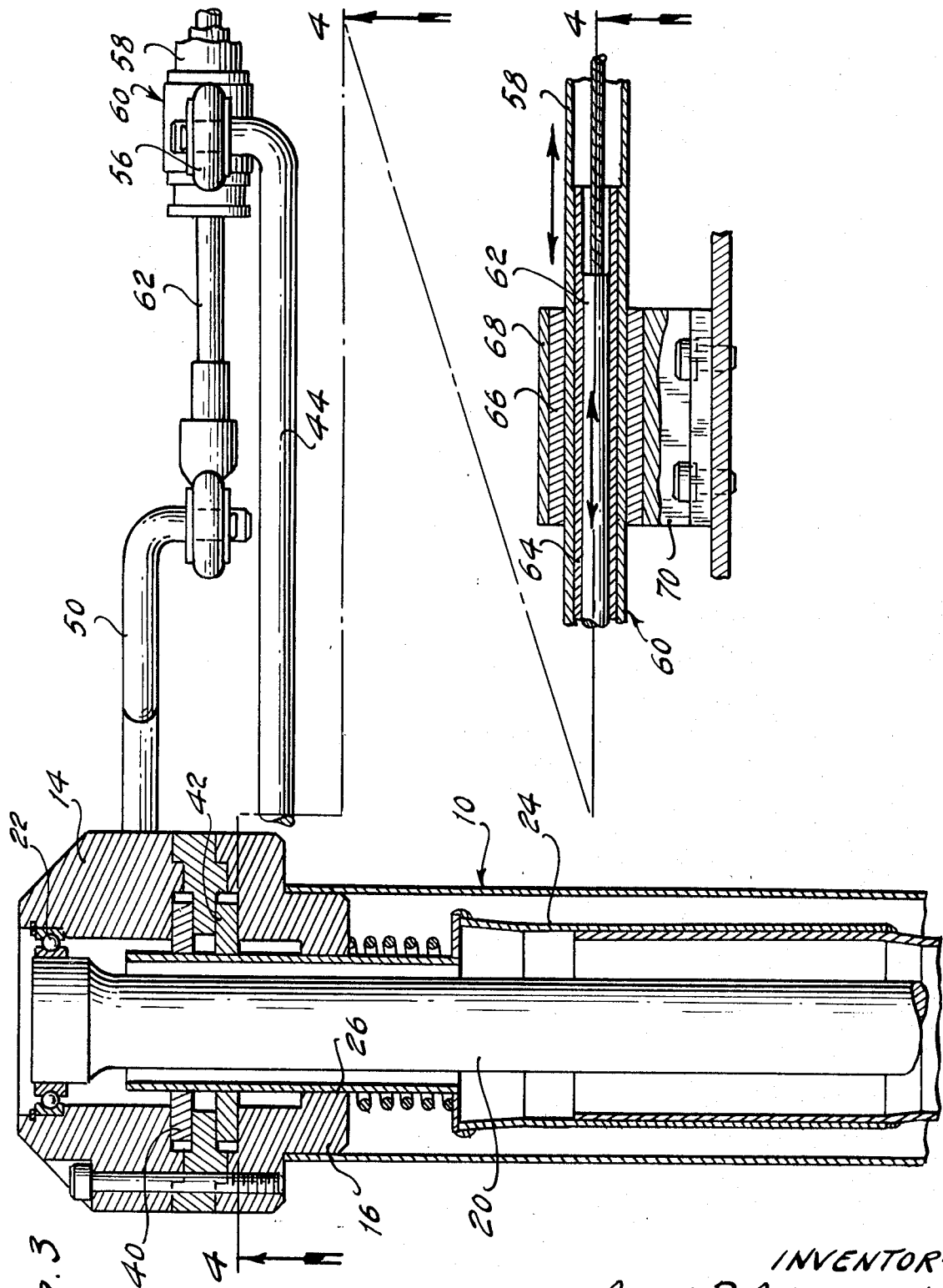

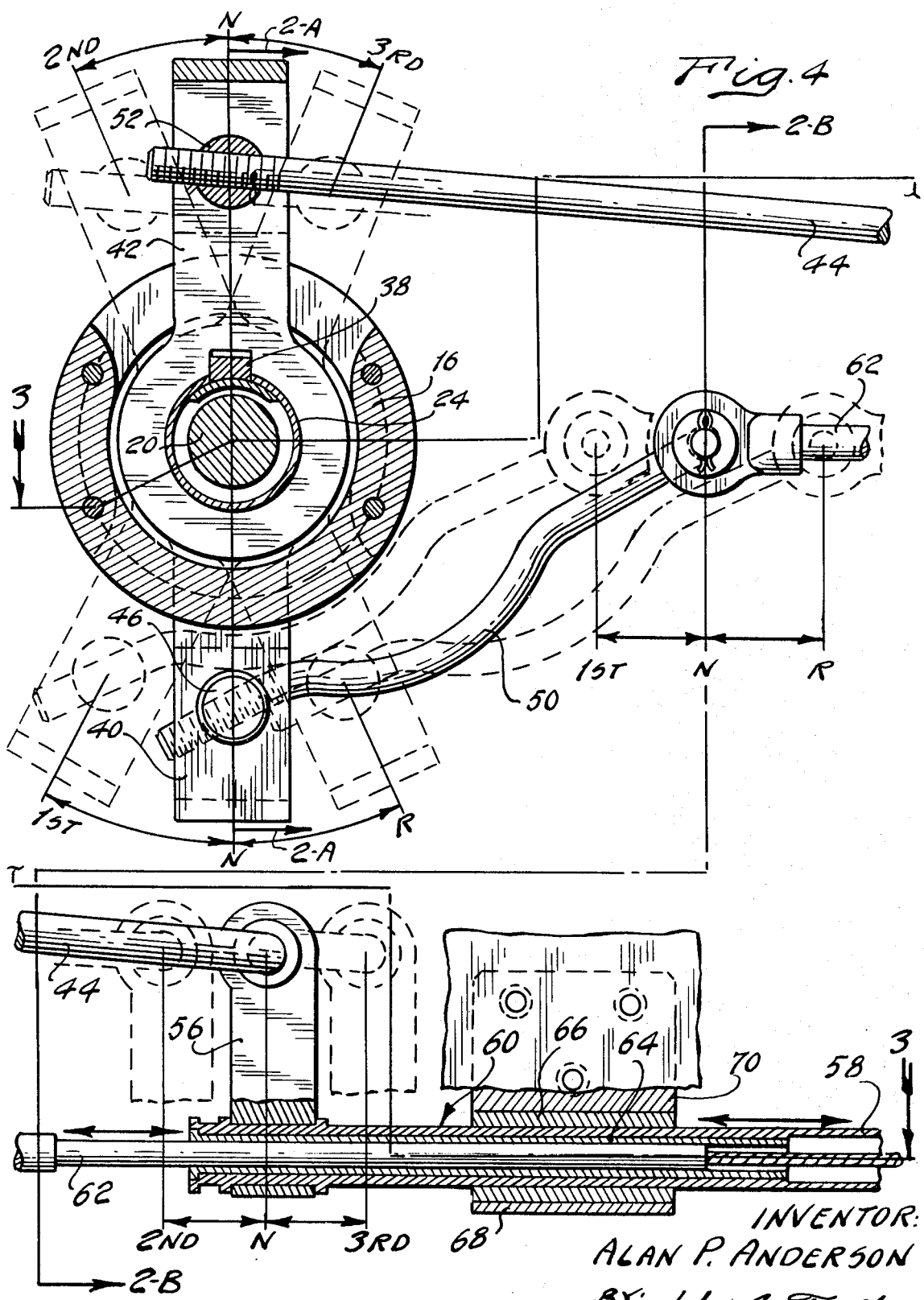

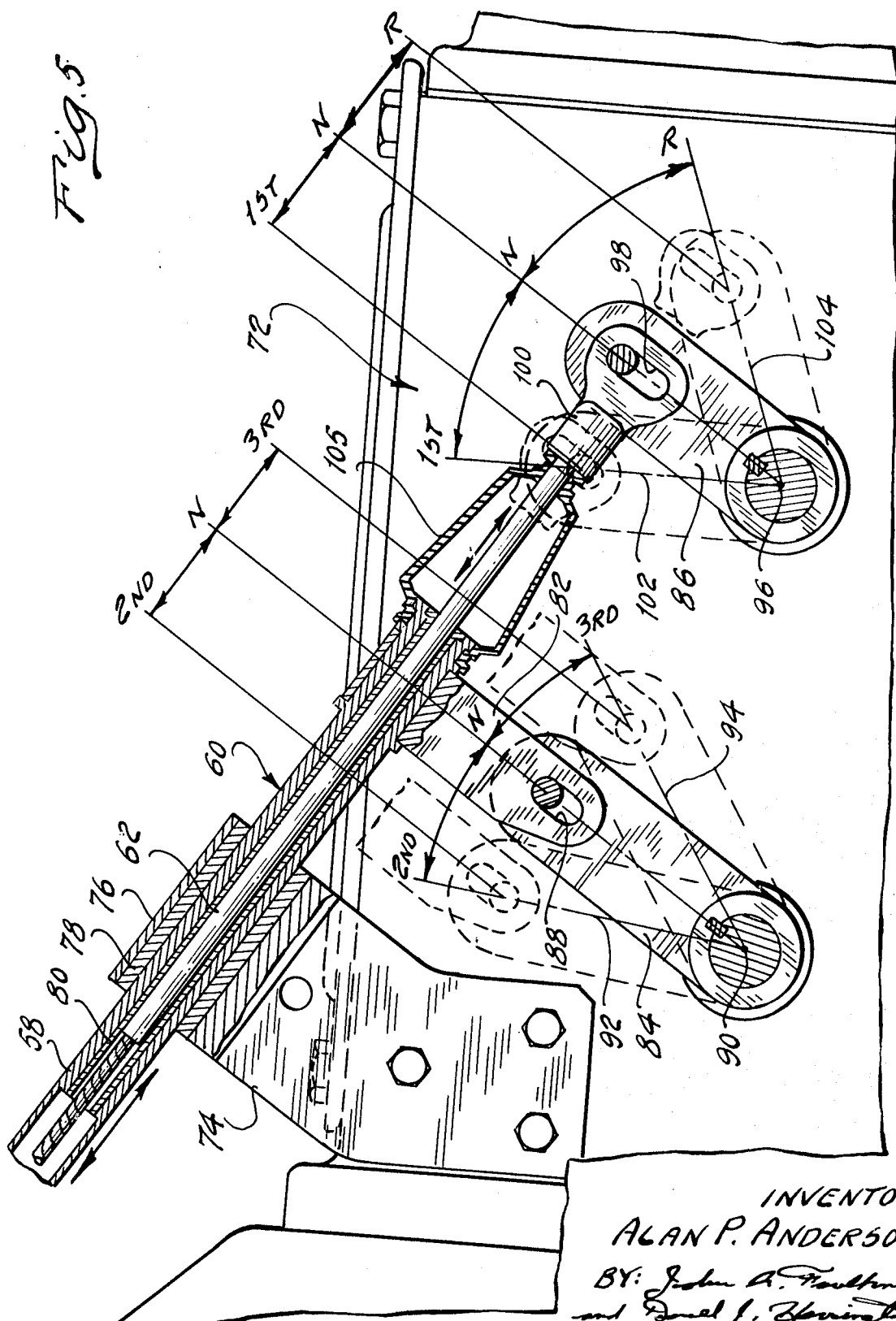

COMPOUND MOTION TRANSMITTING CABLE MECHANISM

GENERAL DESCRIPTION OF THE INVENTION

My invention is adapted to be used in an automotive vehicle driveline. It is capable of transferring motion from a driver-controlled gearshift lever to the transmission shift levers, which usually are mounted on one side of the housing of a power transmission mechanism. The power transmission mechanism is adapted to deliver driving torque from the vehicle engine to the vehicle drive shaft. The shift levers are associated with speed ratio change gearing inside the transmission housing.

It is usual practice in arrangements of this type to mount the driver-operated gearshift lever on the steering wheel column within the vehicle passenger compartment. Levers mounted on the base of the column are connected to the gearshift lever through a transmission shift controlling shaft mounted on the steering column. Either one shift lever or the other can be selected depending upon the motion pattern chosen by the vehicle operator for the gearshift lever.

It is usual practice also to provide a linkage system for transferring motion from the shift levers to the ratio changing levers mounted on the transmission housing. This lever system must be located within the vehicle engine compartment where only a minimum amount of space is available.

The improvement of my invention overcomes the space problems associated with transferring the motion from the steering column mounted levers to the levers mounted on the transmission housing. I accomplish this by providing a compound cable having a central core and an adjustable shield within which the core of the cable is disposed. The shield of the cable structure is connected operatively to one steering column mounted lever and its other end is connected operatively to one of the shift levers mounted on the transmission housing. Further, the central core of the cable structure is connected to the other steering column mounted lever and its other end is connected to the other shift lever on the transmission housing. In this way, either one of the core portion or the cable structure can move relative to the shield portion or the shield portion can move relative to the core portion. When one of the portions is anchored or held stationary, the other portion can be adjusted.

The cable assembly itself can be positioned at any convenient location within the engine compartment and arranged to avoid interference with other structural elements within the engine compartment.

The anchoring of either one cable portion or the other is accomplished by the usual transmission interlock mechanism which forms an integral part of the transmission structure itself. When one of the shift levers mounted on the transmission housing is in a neutral position, the other shift lever can be moved to one of its torque transmitting positions. When it is in that position, the first shift lever cannot be moved because of the action of the interlock. Conversely, the first shift lever on the transmission housing is anchored in the neutral position when the other shift lever is moved to one of its torque transmitting positions. Thus, either one cable portion or the other is anchored or held stationary since it is connected positively through the anchored shift lever and the interlock mechanism to the transmission housing.

BRIEF DESCRIPTION OF THE FIGURES OF THE DRAWING

FIG. 1 shows in cross-sectional form the upper portion of a steering column assembly for an automotive vehicle and a side elevation view of a power transmission mechanism.

FIG. 2A shows the lower end of my improved cable system in cross-sectional form.

FIG. 2B is a cross-sectional view taken along the section line 2B–2B of FIG. 4.

FIG. 3 is a plan view partly in section showing the base portion of the column structure of FIG. 1 as seen from the plane of section line 3–3 of FIG. 1.

FIG. 4 is a cross-sectional view of the upper portion of the cable system as seen from the plane of section line 4–4 of FIG. 1.

FIG. 5 is a view of the lower end of the cable system.

PARTICULAR DESCRIPTION OF THE INVENTION

Figure 2C:
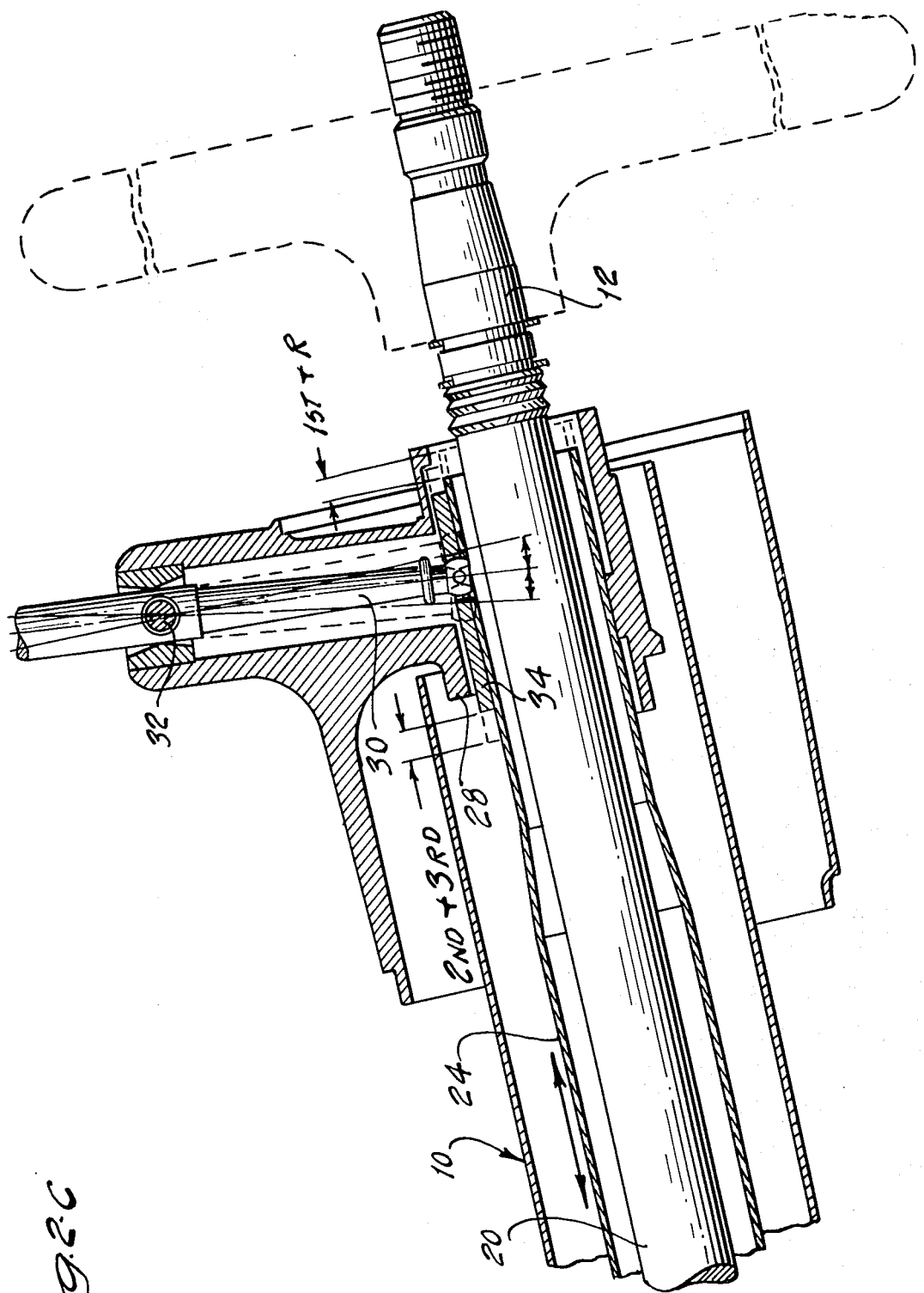
FIG. 2C is a cross-sectional view of the upper end of the column structure of FIG. 2A.

In FIG. 1, numeral 10 designates a stationary steering column housing for an automotive vehicle. It may be secured by suitable brackets to the dash structure of the vehicle body with its upper end 12 located within the vehicle passenger compartment. The end 12 is splined as shown to permit a torque transmitting connection with a vehicle steering wheel. A support 14 is carried by the base of the member 10. It includes a portion 16 received within the open end of the member 10. Support member 14 is formed with a central opening 18 within which one end of the steering shaft 20 is journaled, a suitable bearing 22 being provided for this purpose.

A cylindrical shift tube 24 is positioned slidably within the member 10. It is situated above the steering shaft 20. The lower end of the tube 24 is slidably supported in bearing opening 26 formed in the member 14.

The upper end of the shift tube 24 is supported by gearshift lever support 28, which in turn is journaled for oscillation on the stationary member 10.

A gearshift lever 30 is pivoted on the member 28 by pin 32. The radially inward end of the lever 30 engages an opening in reinforcement 34, which in turn is mounted for reciprocation and for rotation within the support 28.

When the gearshift lever 30 is rotated about the axis of the shaft 20, the shift tube 24 is rotated with it. On the other hand, when the gearshift lever 30 is moved about the pivot pin 32, the shift tube 24 will move in the direction of the axis of the steering shaft 20.

A pair of keys 36 and 38 is supported at the lower end of the shift tube 24. Shift linkage elements 40 and 42 mounted on the support 14 include openings through which the shift tube extends. Each of the elements 40 and 42 is formed with a keyway which receives one of the keys 36 and 38.

When the shift tube 24 is moved in a downward direction, a driving connection is established between the key 38 and the element 42. Upon subsequent rotation of the shift tube 24, linkage element 42 is rotated about the axis of the shaft 22.

Conversely, when the shift tube 24 is moved in an upward direction, key 36 engages linkage element 40. Upon subsequent rotation of the shift tube 24, linkage element 40 can be oscillated about the axis of the shaft 20. Thus, either one or the other of the linkage elements 40 or 42 can be oscillated depending upon the axial position of the shift tube 24.

The radially outward end of the linkage element 40 is formed with a general U-shape.

The shift rod 50, best seen in FIG. 4, is formed with a bearing head 46 situated between the sides of the U-shaped element 40.

A transverse extension 48 on the head 46 is received through an opening formed in the end of lever element 40, thereby providing pivot connection between lever element 40 and the rod 50. A similar connection is provided between the lever element 42 and a second rod 44, the latter having an end bearing 52 with a transverse extension 54 received through an opening in the end of the lever element 42.

As indicated best in FIG. 4, rod 44 is connected at its other end to shift member 56, which is supported on and carried by the shielding sleeve 58 of a compound cable assembly 60. The member 56 is secured to the sleeve 58 and prevented from movement axially relative thereto by shoulders, as indicated in FIG. 4.

The other end of the rod 50 is connected directly to the core portion 62 of the cable assembly 60. A sleeve bearing 64 is situated between the core portion 62 and the shielding sleeve 58 to prevent relative sliding movement of one with respect to the other.

The shielding sleeve 58 is slidably received within a bushing 66, which in turn is supported by circular sleeve 68. The sleeve 68 in turn is secured fast to bracket 70. This bracket may be connected to any stationary portion of the vehicle, such as the forward body structure forming the firewall between the engine compartment and the vehicle passenger compartment.

The cable assembly 60 is trained through the engine compartment and extends downwardly to a location directly adjacent the transmission housing shown generally at 72. The supporting bracket 74 is secured to the housing 72. It includes a sleeve 76 through which the shielding sleeve 58 and the core portion 62 is positioned. A bearing sleeve 78 slidably supports the shielding sleeve 58 within the bracket 74. Another bearing sleeve 80 is positioned between the core portion 62 and the shielding sleeve 58 to permit relative sliding movement of the core portion 62 and the sleeve 58, one with respect to the other.

A transmission shift member 82 is fixed to and carried by the shielding sleeve 58 at its lowermost end. It is held axially fast relative to the sleeve 58. It moves toward and away from the bracket 74 as the sleeve 58 moves within the bearing sleeve 78.

Transmission 72 is provided with two shift levers, shown at 84 and 86. As shift levers 84 and 86 are rotated, transmission shift forks within the transmission housing 72 engage and disengage transmission synchronizer clutch elements as ratio changes are initiated, in the usual fashion.

Shift lever 84 is connected to the end of the member 82 by means of a pin and slot connection 88. When the member 82 moves toward and away from the bracket 74, lever 84 is rotated about the axis 90. When the lever 84 assumes the position represented by the centerline 92, the transmission will assume a second speed ratio condition. When the lever 84 assumes the position indicated by the centerline 94, the transmission will assume a high speed ratio condition.

Speed ratio changes between the first speed ratio and the reverse drive ratio are controlled by shift lever 86 as it is oscillated about axis 96. The radially outward end of the lever 86 is connected by means of a pin and slot connection 98 to an eyelet 100 fixed to the lower end of the core portion 62 for the cable assembly 60. When the lever 86 is moved to the position indicated by the centerline 102, the transmission is conditioned for first speed ratio operation. When lever 86 moves to the position indicated by the centerline 104, the transmission is in the reverse drive condition.

The transmission is in a neutral condition when the levers 84 and 86 assume the positions shown in FIG. 2.

The usual transmission interlock mechanism, not shown, will prevent lever 86 from moving from the neutral position shown in FIG. 2 whenever the lever 84 is in one of its operating positions. That is, when the lever 84 assumes either the first ratio position or the third speed ratio position, the lever 86 cannot be moved. Conversely, when the lever 86 assumes a reverse drive position or the first speed ratio position, indicated by the centerlines 104 and 102 respectively, lever 84 cannot be moved from its neutral position shown in FIG. 2.

A protective, flexible seal 105 surrounds the lower end of the core portion 62 of the cable assembly 60. Seal 105 has two end openings one of which surrounds the shielding portion 58 and the other of which surrounds the core portion 62.

When the operator rotates linkage element 42, the motion imparted to the rod 44 is transferred to the shield sleeve 58 of the cable assembly 60. At that time, the transmission interlock structure causes the lever 86 to remain stationary, thereby permitting the core 62 of the cable assembly to be anchored. Conversely, when the operator actuates linkage element 42, core 62 is moved and the transmission interlock structure holds lever 84 stationary, thereby anchoring the shield sleeve 58.

Having thus described a preferred form of my invention, what I claim and desire to secure by U.S. Letters Patent is:

1. A transmission gearshift mechanism controlling the motion of each of a pair of shift levers for a power transmission mechanism in an automotive vehicle driveline comprising a compound cable assembly having a core portion and a shielding portion surrounding said core portion, said shielding portion being connected operatively to one of said shift levers and said core portion being connected operatively to the other of said shift levers, and personally operable gearshift linkage means for shifting said core portion relative to said shielding portion thereby shifting said other lever from one operating position to another as said one lever remains stationary, said linkage means being adapted also to move said shielding portion relative to said core portion thereby effecting movement of said one lever as said other lever remains stationary.

2. The mechanism as set forth in claim 1 wherein said gearshift linkage means comprises a personally operable shift shaft, means for mounting said shift shaft for axial displacement as well as rotary displacement, a pair of lever elements mounted for oscillation about the axis of said shift shaft, and clutch means for connecting selectively each of said lever elements and said shift shaft upon axial displacement of said shift shaft whereby rotary adjustment of said shift shaft will effect shifting movement of said shift levers.

3. The mechanism as set forth in claim 1 wherein said linkage means includes first bracket structure secured in fixed relationship with respect to said transmission mechanism and engaged with said cable assembly at one end of the latter, and second bracket structure positioned at a remote location relative to said first bracket structure and fixed relative to said shift shaft, the other end of said cable assembly being secured to said second bracket structure.

4. The mechanism as set forth in claim 2 wherein said linkage means comprises also first bracket structure secured in fixed relationship with respect to said transmission mechanism and engaged with said cable assembly at one end of the latter, and second bracket structure positioned at a remote location relative to said first bracket structure and fixed relative to said shift shaft, the other end of said cable assembly being secured to said second bracket structure.